United States Patent [19]
Watanabe

[11] Patent Number: 5,407,288
[45] Date of Patent: Apr. 18, 1995

[54] SLIDING TYPE COUPLING DEVICE HAVING SLIDABLE MEMBER WITH GAP-FILLING PORTION AND METHOD OF PRODUCING THE SAME

[75] Inventor: Hiroyuki Watanabe, Gifu, Japan

[73] Assignee: Tokai Rubber Industries, Ltd., Japan

[21] Appl. No.: 81,160

[22] Filed: Jun. 25, 1993

[30] Foreign Application Priority Data

Jun. 30, 1992 [JP] Japan .................................. 4-196155

[51] Int. Cl.⁶ .............................................. F16C 11/08
[52] U.S. Cl. .................................... 403/133; 403/122; 403/140
[58] Field of Search ................ 403/133, 132, 135, 140, 403/122

[56] References Cited

U.S. PATENT DOCUMENTS

| | | | |
|---|---|---|---|
| 3,461,529 | 8/1969 | Van Dorn | 29/149.5 |
| 3,588,201 | 6/1971 | Schmidt | 308/36.1 |
| 3,700,295 | 10/1972 | Butzow et al. | 308/72 |
| 4,040,883 | 10/1977 | Matt et al. | 156/148 |
| 4,190,302 | 2/1980 | Lynn et al. | 308/36.1 |
| 4,714,368 | 12/1987 | Sawada et al. | 403/133 |
| 4,880,329 | 11/1989 | Sakai | 403/135 |
| 4,883,263 | 11/1989 | Buhl | 403/133 |
| 5,092,703 | 3/1992 | Kobayashi . | |
| 5,116,159 | 5/1992 | Kern, Jr. et al. | 403/132 |
| 5,284,398 | 2/1994 | Sakai | 403/135 |

FOREIGN PATENT DOCUMENTS

| | | |
|---|---|---|
| 1908074 | 7/1970 | Germany . |
| 1627783 | 8/1970 | Germany . |
| 1905067 | 8/1970 | Germany . |
| 4009156 | 9/1990 | Germany . |
| 55-124314 | 2/1954 | Japan . |
| 55-39853 | 9/1980 | Japan . |
| 64-6512 | 1/1989 | Japan . |

*Primary Examiner*—John T. Kwon
*Attorney, Agent, or Firm*—Parkhurst, Wendel & Rossi

[57] ABSTRACT

A sliding type coupling device is disclosed which includes: an inner member having a sliding contact portion; a cylindrical outer member which receives therein the sliding contact portion; and a slidable member made of synthetic resin and attached to an inner surface of the outer member. The sliding contact portion of the inner member is slidably supported by an inner circumferential surface of the slidable member. The coupling device further includes a substantially annular retainer ring disposed in engagement with a circumferential groove formed in an inner surface of the outer member. The retainer ring abuts on one axial end of the slidable member, so as to limit an axial displacement of the slidable member. The slidable member includes a gap-filing portion which intrudes into the groove and fills a gap between an inner wall of the groove and the retainer ring.

7 Claims, 7 Drawing Sheets

SLIDING TYPE COUPLING DEVICE HAVING SLIDABLE MEMBER WITH GAP-FILLING PORTION AND METHOD OF PRODUCING THE SAME

BACKGROUND OF THE INVENTION

1. Field of the Invention

The present invention relates in general to a sliding type coupling device and a method of producing the same, and more particularly to such a sliding type coupling device which is simple in construction and is substantially free from rattling and variation of its sliding torque, and a method of producing such a coupling device.

2. Discussion of the Related Art

There are known sliding type coupling devices of one type as disclosed in Publication No. 55-39853 of examined Japanese Utility Model Application and Publication No. 55-124314 of unexamined Japanese Utility Model Application. The coupling device of this type includes: an inner member provided with a sliding contact portion having a spherical or cylindrical outer circumferential surface; a cylindrical or sleeve-like outer member which is open at at least one axial end and receives therein the sliding contact portion of the inner member; and a slidable member made of a synthetic resin and attached to an inner surface of the outer member. The sliding contact portion of the inner member is slidably supported by the inner circumferential surface of the slidable member.

In the known sliding type coupling device as described above, the slidable member is attached to the outer member in the manner as disclosed in the above-identified publications. More specifically, the slidable member is first inserted into the outer member, and is kept in position with its opposite axial end faces held or retained by retainer rings that are press-fitted into inner circumferential surfaces of open end portions of the outer member. The retainer rings serve to prevent the slidable member from slipping out of the outer member. In order to assure higher resistance to slipping of the slidable member out of the outer member, and improved capability of the coupling device to endure axial loads, circumferential grooves may be preferably formed in the inner surfaces of the open end portions of the outer sleeve, so as to receive or engage with the retainer rings for holding the slidable member in position.

With the slidable member attached to the outer member in the manner as described above, however, rattling may occur between the slidable member and the outer member, due to loose engagement of the retainer rings with relevant portions of the outer member, dimensional errors in the slidable member and outer member, and other factors. Further, the axial gripping force applied by the retainer rings to the slidable member may not be stabilized, causing variation of the pressure at sliding surfaces of the inner member and slidable member, whereby the sliding capability may vary from one product to another.

To assure tight engagement of the retainer rings with the outer member, it is proposed to caulk an outer peripheral portion of the retainer ring against the outer member, so that the ring is fixedly fitted in the annular groove formed in the outer member, as disclosed in JP-A-64-6512. However, the thus constructed coupling device must be manufactured with low efficiency, at an increased cost, due to a need for an exclusive process step for caulking the retainer ring. Further, the coupling device still suffers from rattling of the slidable member and variation of the sliding capability, due to dimensional errors of the slidable member and outer member, for example, even if the retainer ring is fixed by caulking to the outer member.

SUMMARY OF THE INVENTION

It is therefore a first object of the present invention to provide a sliding type coupling device which is simple in construction, and which is substantially free from rattling or displacement occuring at engaged portions of a slidable member and an outer member, and from variation of its sliding torque at sliding surfaces of the slidable member and an inner member, assuring excellent sliding capability with high stability.

It is a second object of the invention to provide a method of producing such a sliding type coupling device as described just above.

The first object may be attained according to a first aspect of the present invention, which provides a sliding type coupling device comprising: an inner member having a sliding contact portion; a cylindrical outer member which is open at at least one axial end thereof and which receives therein the sliding contact portion of the inner member, the outer member having a circumferential groove formed in an inner surface of an axial end portion of the outer member which is open at one of the above-indicated at least one axial end; a slidable member made of a synthetic resin and attached to an inner surface of the outer member, the slidable member having an inner circumferential surface which is held in sliding contact with an outer circumferential surface of the sliding contact portion of the inner member; and an annular retainer ring disposed in engagement with the circumferential groove, the retainer ring abutting on one of opposite axial ends of the slidable member, for limiting an axial displacement of the slidable member, the slidable member including a gap-filing portion which intrudes into the circumferential groove and fills a gap between an inner wall of the groove and the retainer ring.

In the present sliding type coupling device constructed as described above, the slidable member includes the gap-filling portion as an integral part thereof, for filling a gap or clearance between the inner wall of the groove and the retainer ring, whereby rattling of the retainer ring in the groove can be completely avoided.

Further, since the slidable member is formed directly out of a resin material that fills a space between the inner and outer members, the manufacturing errors in the dimensions of the inner and outer members and others can be advantageously compensated or tolerated during formation of the slidable member, whereby no clearance is formed between the slidable member and the retainer ring. At the same time, the inner circumferential surface of the slidable member conforms with high accuracy to the shape of the outer circumferential surface of the sliding contact portion of the inner member, whereby a constant clearance and a constant pressure can be obtained between these sliding surfaces of the slidable member and the inner member.

Consequently, the sliding type coupling device according to the present invention is substantially free from rattling between the slidable member and the outer member, and exhibits excellent sliding capability with high stability.

The second object of the invention may be attained according to a second aspect of the invention, which provides a method of producing a sliding type coupling device including an inner member having a sliding contact portion, a cylindrical outer member which is open at at least one axial end thereof and which receives therein the sliding contact portion of the inner member, and a slidable member made of a synthetic resin material and attached to the outer member, for slidably supporting the sliding contact portion of the inner member, the method comprising the steps of: forming a circumferential groove in an inner surface of an axial end portion of the outer member which is open at one of the at least one axial end; inserting the inner member into the outer member to set the inner and outer members in position, and disposing an annular retainer ring in engagement with the circumferential groove; and injecting the synthetic resin material into a space between the inner and outer members, to thereby form the slidable member which contacts at one of opposite axial ends thereof with the annular retainer ring and whose axial displacement is limited by the retainer ring, the synthetic resin material for the slidable member intruding into the circumferential groove of the outer sleeve, and filling a gap between an inner wall of the groove and the retainer ring.

The above-described method of the invention makes it possible to efficiently produce the sliding type coupling device which assures excellent sliding capability and which is substantially free from rattling between the sliding member and the outer member.

BRIEF DESCRIPTION OF THE DRAWINGS

The above and optional objects, features and advantages of the present invention will become apparent by reading the following detailed description of presently preferred embodiments of the invention, when considered in conjunction with the accompanying drawings, in which.

DETAILED DESCRIPTION OF THE PREFERRED EMBODIMENTS

Figure 1:
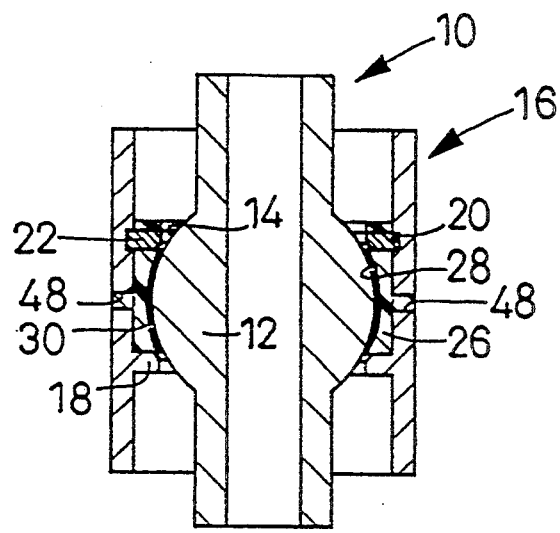
FIG. 1 is an elevational view in axial cross section of one embodiment of a spherical sliding type coupling device of the present invention.
Figure 2:
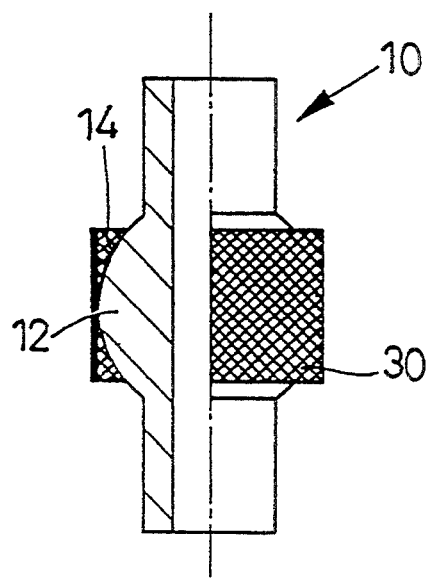
FIG. 2 is a view in half cross section showing an inner sleeve of the sliding type coupling device of FIG. 1, on which sleeve is provided a sliding cloth.

Referring first to FIG. 1 showing one embodiment of a spherical sliding type bushing of the present invention, reference numeral 10 denotes an inner member in the form of an inner metal sleeve which assumes a generally cylindrical shape with a relatively large thickness, as also shown in FIG. 2. The inner sleeve 10 is formed integrally with a spherical sliding contact portion 12 which protrudes radially outwards from an axially middle portion of the sleeve 10. The sliding contact portion 12 has a peripheral convex spherical surface 14 as its outer circumferential surface.

Radially outwardly of the inner sleeve 10, there is provided an outer member in the form of an outer metal sleeve 16 having a cylindrical shape with a relatively small thickness, such that the inner and outer sleeves 10, 12 are disposed coaxially with each other, with a suitable radial spacing therebetween. The outer sleeve 16 has an inside diameter that is larger by a given value than the outside diameter of the sliding contact portion 12 of the inner sleeve 10, and has an axial length that is smaller by a given value than that of the inner sleeve 10. This outer sleeve 16 is disposed so as to cover or surround the spherical convex surface 14 of the inner sleeve 10.

Figure 3:
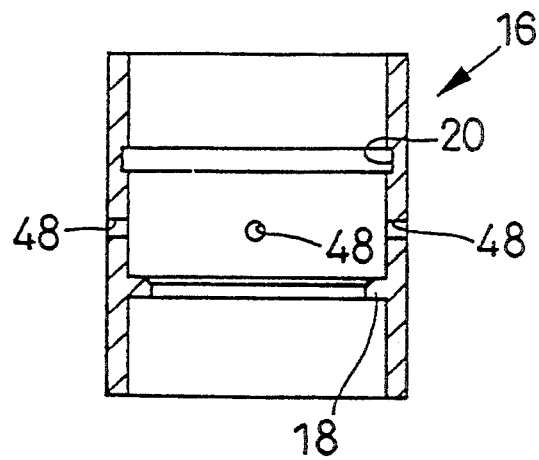
FIG. 3 is an axial cross sectional view showing an outer sleeve of the sliding type coupling device of FIG. 1.

As shown in detail in FIG. 3, the outer sleeve 16 is formed integrally with an annular protrusion or rib 18, which protrudes radially inwards from an axial position of the sleeve 16 that is spaced a given distance from its axial middle point in a direction toward its one axial end. The outer sleeve 16 also has an annular or circumferential groove 20 formed in an axial position thereof that is spaced a given distance from the axial middle point of the sleeve 16 in a direction toward the other axial end.

Figure 4:
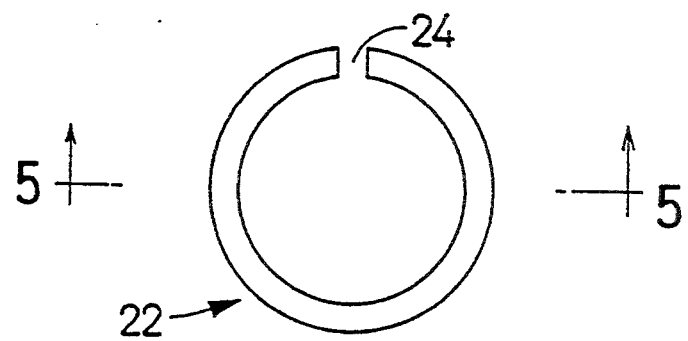
FIG. 4 is a plan view showing a retainer ring of the sliding type coupling device of FIG. 1.
Figure 5:
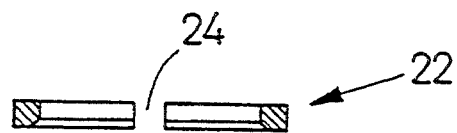
FIG. 5 is a cross sectional view taken along the line 5—5 of FIG. 4.

Annular retainer ring 22 is partially received in the annular groove 20 of the outer sleeve 16. The retainer ring 22 takes the form of a snap ring, that is, is provided with a single radial slit 24, as shown in FIGS. 4 and 5, which permits changes in the diameter of the ring 22. This retainer ring 22 is attached to the outer sleeve 16, such that a radially outer portion or outer peripheral portion of the ring 22 is received in the annular groove 20 for engagement with the outer sleeve 16.

A slidable member 26 is provided on the inner circumferential surface of the outer sleeve 16, such that the member 26 is positioned between the annular rib 18 and the retainer ring 22 partially received in the annular groove 20. The slidable member 26 has a generally cylindrical shape, and is secured at its outer circumferential surface to the outer sleeve 16. At the same time, axially opposite end portions of the slidable member 26 are held in engagement with the annular rib 18 of the outer sleeve 16 and the retainer ring 22, respectively, whereby the slidable member 26 cannot be displaced or moved relative to the outer sleeve 16 in the axial direction.

The slidable member 26 has a spherical concave inner surface 28 as its inner circumferential surface, which conforms to the shape of the spherical convex surface 14 of the sliding contact portion 12 of the inner sleeve 10. With the spherical convex surface 14 of the sliding contact portion 12 in sliding contact with the spherical concave inner surface 28 of the slidable member 26, a sliding interface is formed between these spherical concave and convex surfaces 28, 14. In the instant embodiment, a sliding cloth 30 made of low-friction fibers, such as a Teflon cloth, is provided on the spherical concave inner surface 28 of the slidable member 26, so as to reduce the frictional resistance at the sliding interface. The slidable member 26 is favorably formed of a low-friction synthetic resin or oleo-resin, such as polyacetal. In this embodiment, however, the material for the slidable member 26 may be selected from various other kinds of resin materials, such as a fiber reinforced resin, since the sliding cloth 30 provided at the sliding interface can assure excellent sliding capability, even without the use of the low-friction resin for the slidable member 26.

Figure 8:
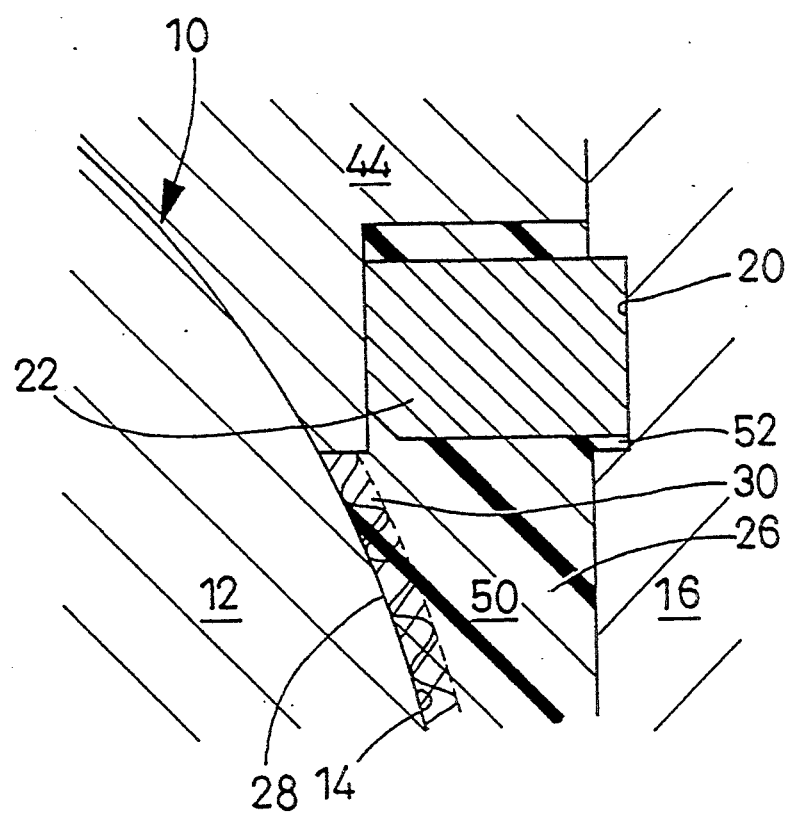
FIG. 8 is a view showing in enlargement a portion of FIG. 7 which is circled by a two-dot chain line and designated by an arrow "a"

The above-described resin material used for forming the slidable member 26 intrudes into the annular groove 20 of the outer sleeve 16, as shown in FIG. 8, so as to fill a gap which is formed between the inner wall of the groove 20 and the retainer ring 22 engaging the groove 20. In this arrangement, rattling of the retainer ring 22 in the groove 20 can be favorably avoided, completely preventing axial movements of the slidable member 26 relative to the outer sleeve 16.

In this particular embodiment, the slidable member 26 further includes an axial end portion formed by molding, which covers an axially outer surface of the retainer ring 22. Therefore, absolutely no clearance or gap is formed between the slidable member 26 and the retainer ring 22.

Figure 6:
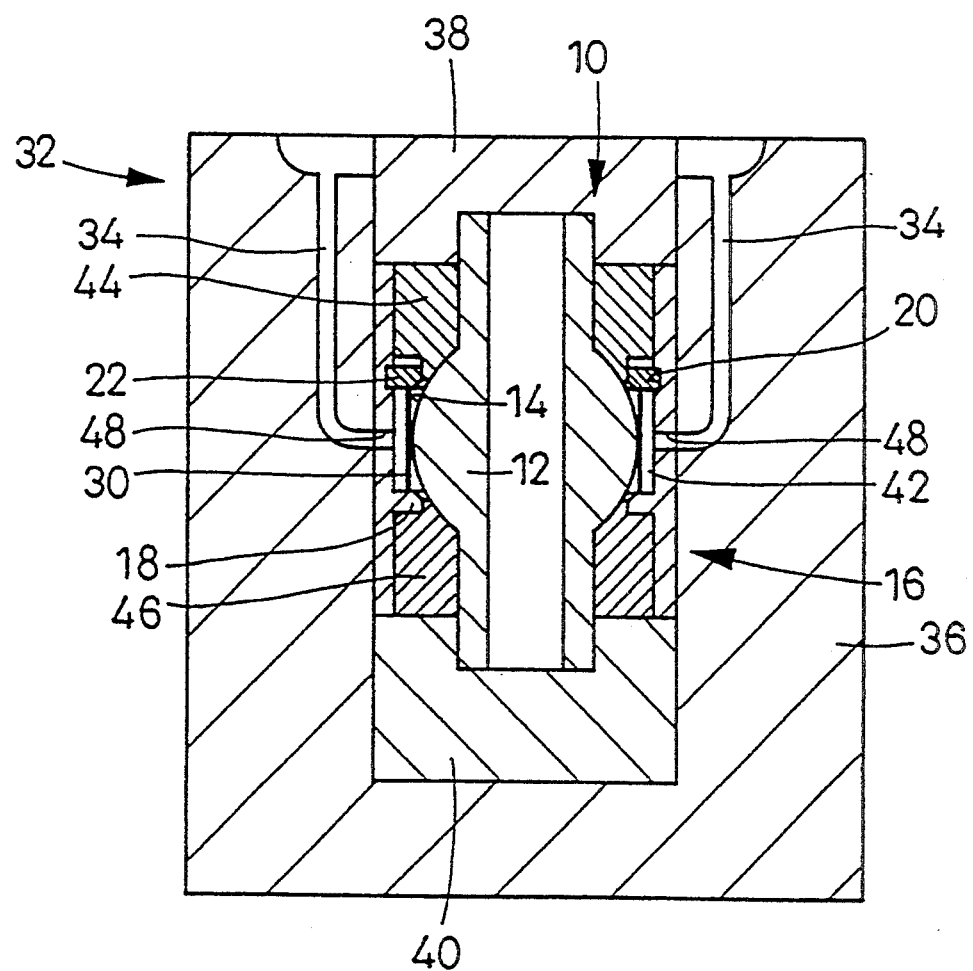
FIG. 6 is a view showing one process step for forming a slidable member by molding during manufacture of the sliding type coupling device of FIG. 1.
Figure 7:
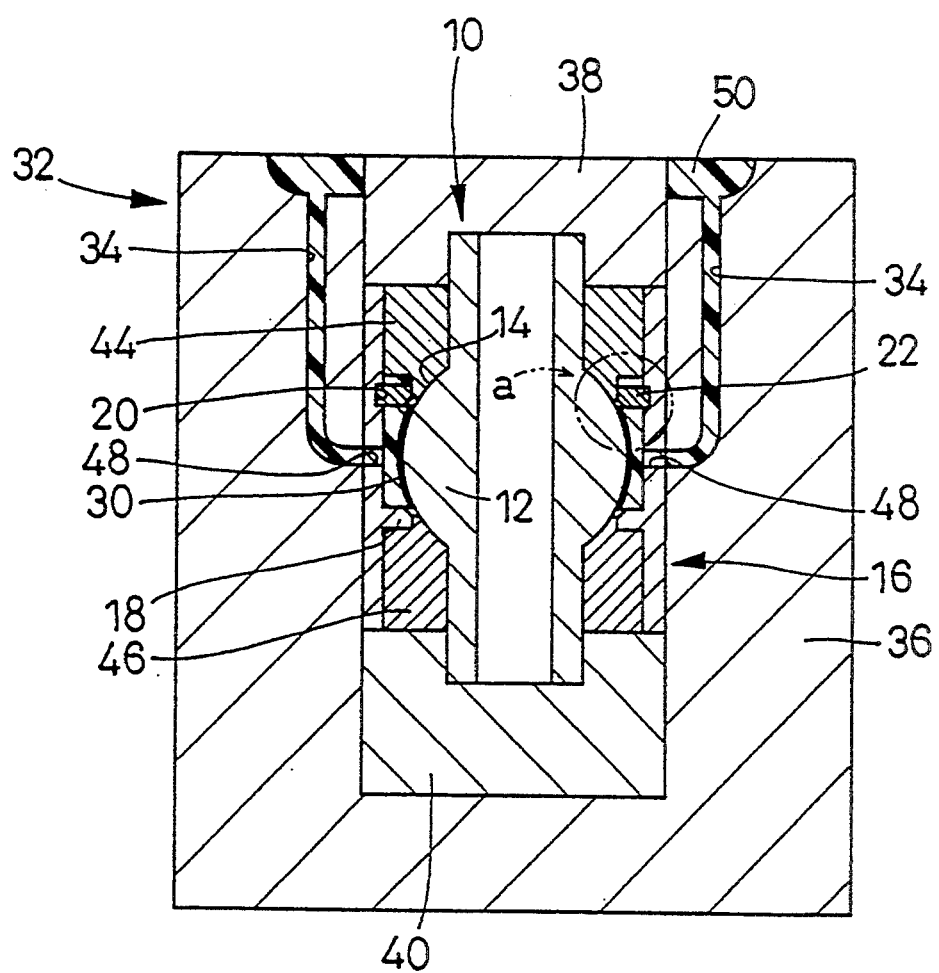
FIG. 7 is a view showing another process step for forming the slidable member of the coupling device of FIG. 1.

Referring next to FIGS. 6 and 7, there will be described a method which is desirably employed for forming the above-described slidable member 26.

Initially, the inner sleeve 10, outer sleeve 16, retainer ring 22 and sliding cloth 30 as shown in FIGS. 2 through 5 are prepared separately. Then, the sliding cloth 30 is disposed on the spherical sliding contact portion 12 of the inner sleeve 10, and the outer sleeve 16 is disposed around the inner sleeve 10. Thereafter, the thus prepared assembly of the inner and outer sleeves 10, 16 and sliding cloth 30 is set in position within a metallic mold 32, as shown in FIG. 6.

The metallic mold 32 consists of an outer frame 36 through which sprues 34 for injected resin are formed; an upper and a lower holder 38, 40 formed on the axially opposite sides of the above-indicated assembly accommodated in the outer frame 36, for holding the inner and outer sleeves 10, 16 in coaxial relation with each other; and an upper and a lower inner mold 44, 46 which are disposed between the inner and outer sleeves 10, 16 so as to define therebetween a mold cavity 42 in which the slidable member 26 is to be formed. The outer sleeve 16 is provided at its axially intermediate portion with a plurality of through-holes 48, through which the sprues 34 formed in the outer frame 36 communicate with the mold cavity 42.

With the assembly of the inner and outer sleeves 10, 16 and sliding cloth 30 disposed in place within the metallic mold 32 as described above, a suitably selected resin material 50 is introduced through the sprues 34 formed in the mold 32, and injected into the mold cavity 42, as shown in FIG. 7. Thus, the mold cavity 42 is filled with the resin material 50, which is then cooled and solidified to thereby form the slidable member 26 as described above.

During the formation of the slidable member 26 by molding as described above, the resin material 50 which fills the mold cavity 42 intrudes into a gap or clearance between the inner wall of the annular groove 20 of the outer sleeve 16 and the retainer ring 22 received in the groove 20 for engagement with the outer sleeve 16, as shown in FIG. 8. As a result, the gap is filled with the resin material 50, whereby the slidable member 26 is formed integrally with a gap-filling portion 52 which is adapted to fix or determine the position of the retaining ring 22 in the annular groove 20.

With the slidable member 26 thus formed, there is formed a slight clearance between the spherical concave inner surface 28 of the slidable member 26 and the spherical convex surface 12 of the sliding contact portion 12 of the inner sleeve 10, due to solidification and resultant shrinkage of the resin material in the mold cavity 42. This clearance provides the sliding interface as indicated above, which conforms with high accuracy to the shape of the spherical convex surface 14, and which is constant in size all over the spherical convex surface 14.

In the present spherical sliding type bushing constructed as described above, therefore, the gap-filling portion 52 formed as an integral part of the slidable member 26 serves to completely avoid or eliminate rattling of the retainer ring 22 against the outer sleeve 16. Accordingly, the retainer ring 22 considerably effectively functions to limit an axial displacement of the slidable member 26 with respect to the outer sleeve 16, with a constant gripping force applied by the ring 22 to the slidable member 26. Consequently, the rattling which may occur between the inner and outer sleeves 10, 16 can be reduced to a minimum.

Further, the gap-filling portion 52 can be formed as an integral part of the slidable member 26 at the same time as the formation of the member 26, without requiring any special procedure for forming the portion 52. Thus, the provision of the gap-filling portion 52 does not result in a complicated structure of the sliding type bushing, or reduced efficiency in producing the bushing. Consequently, the present sliding bushing can be manufactured with high efficiency, at a relatively low cost.

Since the slidable member 26 is formed directly out of the resin material 50 with which the space between the inner and outer sleeves 10, 16 is filled, the manufacturing errors in the dimensions of the inner and outer sleeves 10, 16, retainer ring 22 and others can be advantageously compensated or tolerated upon formation of the slidable member 26, whereby no clearance is formed between the slidable member 26 and the outer sleeve 16 and between the slidable member 26 and the retainer ring 22. Accordingly, the occurrence of rattling between the inner and outer sleeves 10, 16 can be further effectively prevented.

While the present invention has been described in its presently preferred embodiment, for illustrative purpose only, it is to be understood that the invention is not confined to the details of the illustrated embodiment, but may be otherwise embodied.

Figure 9:
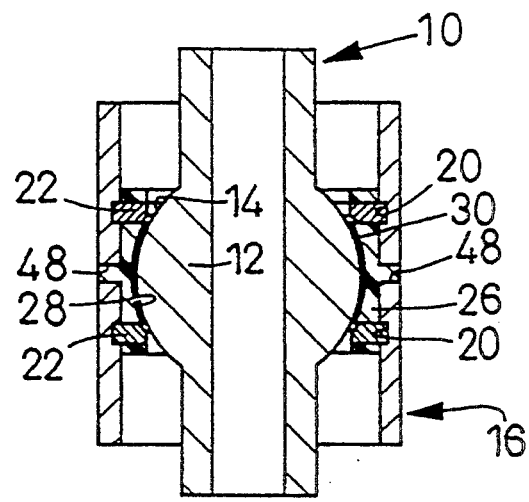
FIG. 9 is an axial cross sectional view of another embodiment of the spherical sliding type coupling device of the present invention.

In the illustrated embodiment, the annular rib 18 formed integrally on the inner circumferential surface of the outer sleeve 16 is located at one of the opposite axial ends of the slidable member 26, to serve as a means for limiting the axial displacement of the slidable member 26. However, a pair of retainer rings 22 may be provided at the opposite axial ends of the slidable member 26, respectively, so as to limit the axial displacement of the slidable member 26, as shown in FIG. 9.

Figure 10:
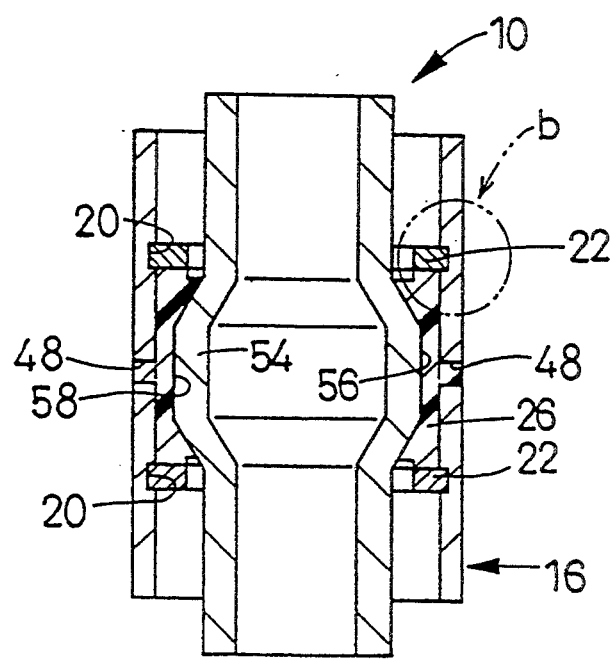
FIG. 10 is an axial cross sectional view of a further embodiment of the spherical sliding type coupling device of the present invention.

Further, the principle of the present invention is equally applicable to a sliding type coupling device which has a sliding interface formed between a cylindrical outer circumferential surface 56 of a non-spherical convex sliding contact portion 54 of the inner sleeve 10, and a corresponding inner circumferential surface 58 of the slidable member 26, as shown in FIG. 10.

In the illustrated embodiment, the slidable member 26 is molded such that the retainer ring 22 is embedded in the slidable member 26. However, this arrangement need not be employed provided the slidable member 26 includes as an integral part thereof the gap-filling portion 52 filling the gap between the inner wall of the annular groove 20 and the retainer ring 22, as shown in FIG. 11.

Figure 11:
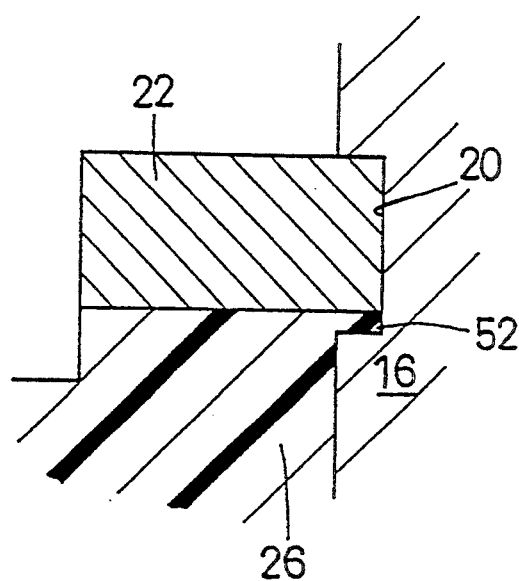
FIG. 11 is a view showing in enlargement a portion of FIG. 10 which is designated by an arrow "b".

In FIG. 10 and 11, the same reference numerals as used in the first embodiment are used for identifying the structurally corresponding elements or portions, so as to facilitate understanding of the above-described other embodiments of the invention.

In the illustrated embodiment, the cylindrical outer sleeve 16 is open at its axially opposite ends to the exterior space. However, the principle of the present invention is also applicable to a sliding type coupling device or the like in which a ball-like sliding contact portion formed at one axial end of an inner sleeve is received in an outer sleeve which is open only at one axial end, such that the sliding contact portion of the inner sleeve is spherically slidable relative to the outer sleeve.

It is also to be understood that the present invention may be embodied with various other changes, modifications and improvements which may occur to those skilled in the art, without departing from the spirit and scope of the invention as defined in the following claims.

What is claimed is:

1. A sliding type coupling device comprising:
    an inner member having a sliding contact portion;
    a cylindrical outer member which is open at at least one axial end thereof and which receives therein said sliding contact portion of said inner member, said outer member having a circumferential groove formed in an inner surface of an axial end portion of said outer member which is open at one of said at least one axial end;
    a slidable member made of synthetic resin and attached to an inner surface of said outer member, said slidable member having an inner circumferential surface which is held in sliding contact with an outer circumferential surface of said sliding contact portion of said inner member; and
    a substantially annular retainer ring disposed in engagement with said circumferential groove, said retainer ring abutting on one of opposite axial ends of said slidable member, for limiting an axial displacement of said slidable member, said slidable member including a gap-filing portion which intrudes into said circumferential groove and fills a gap between an inner wall of the groove and said retainer ring.

2. A sliding type coupling device as defined in claim 1, wherein said cylindrical outer member further has an annular protrusion formed integrally on an inner surface thereof, said annular protrusion abutting on the other of said opposite axial ends of said slidable member, so as to cooperate with said annular retainer ring to hold said slidable member in position and limit the axial displacement of the slidable member.

3. A sliding type coupling device as defined in claim 1, wherein said slidable member further includes an axial end portion which covers an axially outer surface of said retainer ring.

4. A sliding type coupling device as defined in claim 1, wherein said sliding contact portion of said inner member has a spherical convex surface as said outer circumferential surface, while said slidable member has a spherical concave surface which conforms to said spherical convex surface, as said inner circumferential surface.

5. A sliding type coupling device as defined in claim 1, further comprising a low-friction sliding cloth provided between said inner circumferential surface of said slidable member and said outer circumferential surface of said sliding contact portion of said inner member.

6. A sliding type coupling device as defined in claim 1, wherein said annular retainer ring consists of a snap ring having a radial slit.

7. A sliding type coupling device as defined in claim 1, further comprising another annular retainer ring disposed in engagement with another circumferential groove formed in said outer member, for abutting on the other of said opposite axial ends of said slidable member, so as to cooperate with said annular retainer ring to hold said slidable member in position and limit the axial displacement of the slidable member.

* * * * *